(12) United States Patent
Bridges et al.

(10) Patent No.: US 12,104,559 B1
(45) Date of Patent: Oct. 1, 2024

(54) VAPOR RETENTION DEVICE

(71) Applicant: UNITED LAUNCH ALLIANCE, L.L.C., Centennial, CO (US)

(72) Inventors: Christopher L. Bridges, Golden, CO (US); Bernard Friedrich Kutter, Golden, CO (US); Frank C. Zegler, Idledale, CO (US)

(73) Assignee: United Launch Alliance, L.L.C., Centennial, CO (US)

( * ) Notice: Subject to any disclaimer, the term of this patent is extended or adjusted under 35 U.S.C. 154(b) by 0 days.

(21) Appl. No.: 18/195,179

(22) Filed: May 9, 2023

Related U.S. Application Data (62) Division of application No. 17/404,666, filed on Aug. 17, 2021, now Pat. No. 11,680,544, which is a division of application No. 16/214,588, filed on Dec. 10, 2018, now Pat. No. 11,092,111.

(51) Int. Cl.
| | |
|---|---|
| *F02K 9/60* | (2006.01) |
| *B64G 1/40* | (2006.01) |
| *F02K 9/42* | (2006.01) |
| *F02K 9/44* | (2006.01) |
| *F02K 9/56* | (2006.01) |

(52) U.S. Cl.
CPC ............... *F02K 9/60* (2013.01); *B64G 1/401* (2013.01); *B64G 1/402* (2013.01); *F02K 9/42* (2013.01); *F02K 9/44* (2013.01); *F02K 9/56* (2013.01); *F02K 9/566* (2013.01)

(58) Field of Classification Search
CPC ...... F02K 9/42; F02K 9/44; F02K 9/56; F02K 9/566; F02K 9/60; B64G 1/401; B64G 1/402
See application file for complete search history.

(56) References Cited

U.S. PATENT DOCUMENTS

| | | | |
|---|---|---|---|
| 3,098,353 A | | 7/1963 | Abild |
| 3,295,790 A | | 1/1967 | Webb |
| 3,597,923 A | * | 8/1971 | Simon ...................... F02K 9/44 60/260 |
| 3,923,188 A | * | 12/1975 | Lake, Jr. ................ B65D 88/60 220/501 |
| 4,399,831 A | | 8/1983 | Robert |
| 4,768,541 A | | 9/1988 | Uney et al. |
| 4,901,762 A | | 2/1990 | Miller, Jr. et al. |
| 4,942,653 A | | 7/1990 | Hawkinson |
| 4,976,398 A | | 12/1990 | Bruhn |

(Continued)

OTHER PUBLICATIONS

Official Action for U.S. Appl. No. 16/214,588, dated Oct. 14, 2020, 7 pages Restriction Requirement.

(Continued)

*Primary Examiner* — Kyle Robert Thomas
(74) *Attorney, Agent, or Firm* — Sheridan Ross P.C.

(57) ABSTRACT

Embodiments of the present invention generally relate to a vapor retention device and methods of using a vapor retention device to manage propellant for upper stage space vehicles. The use of a vapor retention device, in combination with controlled acceleration, drives liquid propellant from a propellant supply line communicating with an upper stage main engine back into a propellant tank and establishes an insulating liquid/gas propellant interface that prevents the exchange of gaseous propellant across the interface.

20 Claims, 6 Drawing Sheets

(56) References Cited

U.S. PATENT DOCUMENTS

| | | |
|---|---|---|
| 5,209,115 A | 5/1993 | Bond |
| 5,293,895 A | 3/1994 | Grove et al. |
| 5,901,557 A * | 5/1999 | Grayson .................. F17C 1/00 |
| | | 62/50.7 |
| 5,927,653 A | 7/1999 | Mueller et al. |
| 6,840,275 B2 * | 1/2005 | Grayson ................ B64G 1/402 |
| | | 137/574 |
| 7,395,832 B2 | 7/2008 | Behruzi et al. |
| 7,621,291 B2 | 11/2009 | Behruzi et al. |
| 8,043,396 B2 | 10/2011 | Pessana |
| 8,048,211 B2 | 11/2011 | Behruzi et al. |
| 8,202,357 B2 | 6/2012 | Behruzi et al. |
| 8,381,938 B2 | 2/2013 | Behruzi et al. |
| 8,690,000 B2 | 4/2014 | Lacapere et al. |
| 9,260,205 B2 | 2/2016 | Grayson et al. |
| 9,446,862 B2 * | 9/2016 | Barthoulot ............. B64G 1/002 |
| 9,517,590 B2 | 12/2016 | Dandaleix |
| 9,643,741 B2 | 5/2017 | Hu et al. |
| 11,092,111 B1 | 8/2021 | Bridges et al. |
| 11,680,544 B1 | 6/2023 | Bridges et al. |
| 2014/0053832 A1 | 2/2014 | Postma |
| 2015/0027102 A1 | 1/2015 | Bahn et al. |

OTHER PUBLICATIONS

Official Action for U.S. Appl. No. 16/214,588, dated Nov. 25, 2020, 19 pages.

Notice of Allowance for U.S. Appl. No. 16/214,588, dated Apr. 19, 2021, 10 pages.

Official Action for U.S. Appl. No. 17/404,666, dated Sep. 21, 2022, 24 pages.

Notice of Allowance for U.S. Appl. No. 17/404,666, dated Feb. 9, 2023, 13 pages.

Chato et al. "Screen Channel Liquid Acquisition Devices for Cryogenic Propellants," NASA, Jun. 2005, NASA/TM—2005-213638, 14 pages.

* cited by examiner

VAPOR RETENTION DEVICE

CROSS-REFERENCE TO RELATED APPLICATION

This application is a divisional application of U.S. Ser. No. 17/404,666 filed on Aug. 17, 2021, which is a divisional application of U.S. Ser. No. 16/214,588 filed on Dec. 10, 2018, now U.S. Pat. No. 11,092,111, the entire disclosures of which are incorporated herein by reference.

FIELD OF THE INVENTION

Embodiments of the present invention generally relate to a vapor retention device associated with a cryogenic liquid tank and engine feedline.

BACKGROUND OF THE INVENTION

There is an increasing demand for longer duration space transport at lower cost. Long duration missions are not possible with existing cryogenic launch vehicles. With expectations set on pushing humanity throughout cislunar space and beyond, upper stage performance, including propellant management, must be enhanced.

Upper stage vehicles may utilize a single propellant or two propellants. An existing upper stage, such as Centaur®, utilizes liquid hydrogen and liquid oxygen at cryogenic temperatures. The propellants are stored separately in lightweight stainless-steel tanks whose structural rigidity is provided primarily by the pressure of the propellants within each tank. Typically, the tanks are located coaxially, with the liquid oxygen tank positioned between the liquid hydrogen tank and the engines. This configuration requires the feedline for the liquid hydrogen tank to run around or through the liquid oxygen tank. As a cryogenic propellant warms, including liquid hydrogen and oxygen, it changes phase to a gas which accumulates within the propellant tank. For example, while on the ground, the cryogenic propellant within the hydrogen tank boils due to external heating and pressure within the tank increases. Pressure relief valves are used to vent the building pressure and liquid hydrogen propellant is continuously added to the tank to offset the loss from the phase change. However, losses in space due to external heating cannot be counterbalanced by adding new liquid propellant. Sources of heating include solar heating, heat transfer from warmer propellants (like LO2) to colder propellants (like LH2), as well as soak back heating from engine burns during the course of a mission. Solar heating can warm the liquid propellant making the propellant too warm to burn or cause the liquid propellant to boil off into gas which is then unavailable to burn. One method of addressing solar heating is to reposition the upper stage such that the propellant tanks are shielded from direct solar exposure by other portions of the upper stage vehicle. In addition, any engine burn generates heat within the engine and the surrounding structures, including the propellant feedlines between the engine and the fuel tanks. Even after engine shutdown, liquid propellant remaining in feedlines is subject to warming which, in turn, changes the liquid propellant to gas. Furthermore, when the stage is under acceleration, buoyancy causes the gas to migrate through the feedline to the propellant tank, further warming and converting liquid propellant to gas and draws cold propellant towards the bottom of the tank where these heating sources cause more boiloff. Accordingly, fuel is lost and mission capabilities are degraded.

Devices exist to separate gas propellant from liquid propellant in a fuel tank, however, these devices exist to ensure solely liquid propellant is fed to the engine and not to prevent or reduce intermingling of liquid and gas propellant during engine operation. These devices maintain the liquid propellant in contact with the engine inlet at all times through surface tension and capillary action and do not prevent parasitic heating from continuing to convert liquid propellant to gas and buoyancy from bringing fresh propellant to the heating source. For example, U.S. Pat. No. 5,901,557 entitled "Passive Low Gravity Cryogenic Storage Vessel," discloses a cryogenic propellant storage vessel with a screen trap that divides the interior of the vessel into a liquid phase compartment and gas phase compartment. The overall purpose is to prevent the latter from entering the engine. Over the course of a flight, ullage is formed and comingles with propellant used to fuel rocket burns. However, surface tension formed by liquid propellant interaction with a vane assembly prevent the ullage or gas phase propellant from entering the engine. A complex heat exchange system is further positioned in the base and sump of the propellant tank to cool the propellant.

In U.S. Pat. No. 8,381,938 entitled "Propellant Tank for Cryogenic Liquids," the propellant tank includes an exterior mounted reservoir. The reservoir is in communication with the interior of the tank to allow liquid to flow into the reservoir from where it is then supplied to an engine. Gas is driven out of the reservoir and back into the tank. This system allows migration of warmer gas through liquid propellant thereby warming the liquid propellant and converting some liquid propellant to a gas phase.

U.S. Pat. No. 5,293,895 entitled "Liquid Management Apparatus for Spacecraft" discloses a liquid propellant tank that includes a fill, drain, and feedline extending from one end of the tank and a screen located proximate the feedline. The purpose is to enhance engine performance at zero gravity. Capillary action is used to move propellant to the engine inlet. A screen is located near the engine inlet and is wetted with a liquid film as liquid propellant is withdrawn from the tank for purposes of supplying the engine. The purpose of the screen is to prevent gas existing within the main body of the propellant tank from passing through the screen, entering the feedline and comingling with the supply of propellant to the engine. Engine performance degrades appreciably if gas is comingled with liquid propellant.

SUMMARY OF THE INVENTION

According to embodiments of the present disclosure, methods and apparatus are provided to preserve liquid cryogenic propellant in connection with the operation of a spacecraft.

According to aspects of the present disclosure, an upper stage space vehicle is provided which utilizes a liquid cryogenic propellant system and, more specifically, uses the formation of gaseous cryogenic propellant to preserve liquid cryogenic propellant and thereby extend the duration of a mission. A vapor retention device is used to capture gaseous propellant in the propellant supply line extending between a liquid cryogenic propellant tank and the main engine for the upper stage. The gaseous propellant is created from stationary liquid propellant remaining in the supply line following an engine burn. The supply line and other surrounding structures, are heated during an engine burn. When the engine burn is halted and the flow of liquid propellant ceases, the heated supply line warms the stationary liquid propellant causing it to transition to a gas phase of the propellant. The formation of the gaseous propellant is used to drive the remaining liquid propellant in the supply line into the propellant tank where it is preserved for future use. Simultaneously, settling motors are used to settle the upper stage, including the liquid propellant within the propellant tank. The settling motors maintain the upper stage under a small acceleration which positions the liquid propellant against one side of the vapor retention device. Allowing the liquid propellant to pass through the vapor retention device but preventing the gaseous propellant from passing through. The vapor retention device uses liquid surface tension effects to form an interface along the surface of the vapor retention device to prevent gaseous propellant from passing into the propellant tank and warming the stored liquid propellant. Acceleration levels are selected for the coast period which allow gaseous propellant bubbles to stay attached to the vapor retention device and maintain the liquid/gas interface.

According to aspects of the present disclosure, a cryogenic propellant system for an upper stage space vehicle is disclosed. In at least one embodiment, the upper stage space vehicle has an engine, a first propellant tank containing a first cryogenic propellant and having a propellant port for filling and withdrawing the first cryogenic propellant. It also has a second propellant tank containing a second cryogenic propellant, the second propellant tank is typically coaxially aligned with the first propellant tank although the tanks may be positioned in any other arrangement. A first propellant supply line is in fluid communication between the propellant port of the first propellant tank and the engine associated with the upper stage space vehicle and a first length of the first supply line extends through or around the second propellant tank and terminates at the main engine. A vapor retention device is positioned in the first propellant tank proximate the propellant port and restricts the flow of gas from the first propellant supply line into the first propellant tank during low acceleration periods of flight and permits the flow of liquid propellant from the first propellant tank to the engine through the first propellant supply line during high acceleration periods of flight.

According to aspects of the present disclosure, a method for preserving a cryogenic propellant in connection with the operation of a space vehicle is provided. The method includes providing a space vehicle having at least one engine, at least one propellant tank containing a cryogenic liquid propellant, a propellant port associated with the propellant tank, a propellant supply line having a first end connected to the propellant port and a second end in communication with the at least one engine, and a vapor retention device positioned proximate the propellant port either in the propellant tank, in the supply line or in the port itself. The method further includes, upon shutting down the at least one engine, settling the propellant in the propellant tank and applying a small acceleration to the upper stage while simultaneously using the transition of liquid cryogenic propellant to gaseous cryogenic propellant to force liquid cryogenic propellant from the supply line into the propellant tank. It should be appreciated that this method may be practiced in association with each of multiple liquid cryogenic propellant tanks. The method further includes using the vapor retention device to prevent the gas phase propellant from entering the propellant tank.

According to aspects of the present disclosure, the vapor retention device is a plate with a plurality of apertures. The plate may have a flat or curved surface or both. It may be dome shaped, box shaped, conical or some other shape. Factors that influence the size of the apertures include propellant settling acceleration levels selected for use during a coast periods, propellant supply line geometry to allow for good flow during high g operation (engine burns) and slug flow during low g operation (coasts).

According to aspects of the present disclosure, acceleration of the upper stage can be created in many ways. The method described herein will consist of pulsed settling where the time averaged acceleration is what is important. However, controlled constant thrust or centrifugal rotational acceleration methods create the same effect. Pulsed settling can be time averaged to create the effect of constant acceleration through the selection of the pulse duration which is known to those of skill in the art. Therefore, through selection of the pulsed thrust period and knowledge of the stage mass, acceleration is controlled. Consequently, mission simulations are required to predict the stage mass as a function of time or measure acceleration precisely in order to sequence the correct settling levels for a particular mission.

The term "upper stage" as used herein means any stage or spacecraft carried into space by a launch vehicle. A launch vehicle may carry more than one upper stage into space.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Unless otherwise indicated, all numbers expressing quantities, dimensions, conditions, and so forth used in the specification and claims are to be understood as being modified in all instances by the term "about".

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

These and other advantages will be apparent from the disclosure of the invention(s) contained herein. The above-described embodiments, objectives, and configurations are neither complete nor exhaustive. The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. However, the Detailed Description, the drawing figures, and the exemplary claims set forth herein, taken in conjunction with this Summary of the Invention, define the invention.

BRIEF DESCRIPTION OF THE DRAWINGS

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein.

The accompanying drawings, which are incorporated in and constitute a part of the specification, illustrate embodiments of the invention and, together with the general description of the invention given above and the detailed description of the drawings given below, serve to explain the principles of the invention.

The drawings are not necessarily to scale, and various dimensions may be altered. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Although the following text sets forth a detailed description of embodiments according to the present disclosure, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

The orientation and directions as used herein are relative to the drawings as illustrated. Therefore, it should be appreciated that the terms "above," "below," "top," "bottom," "horizontal," or "vertical" are used to describe the relative location of different parts of the novel mechanism following launch, the position of the spacecraft may no longer remain vertical but may have other orientations. Thus, the novel mechanism may be oriented differently in flight, but the relative position of the novel mechanism is as described.

Figure 1:
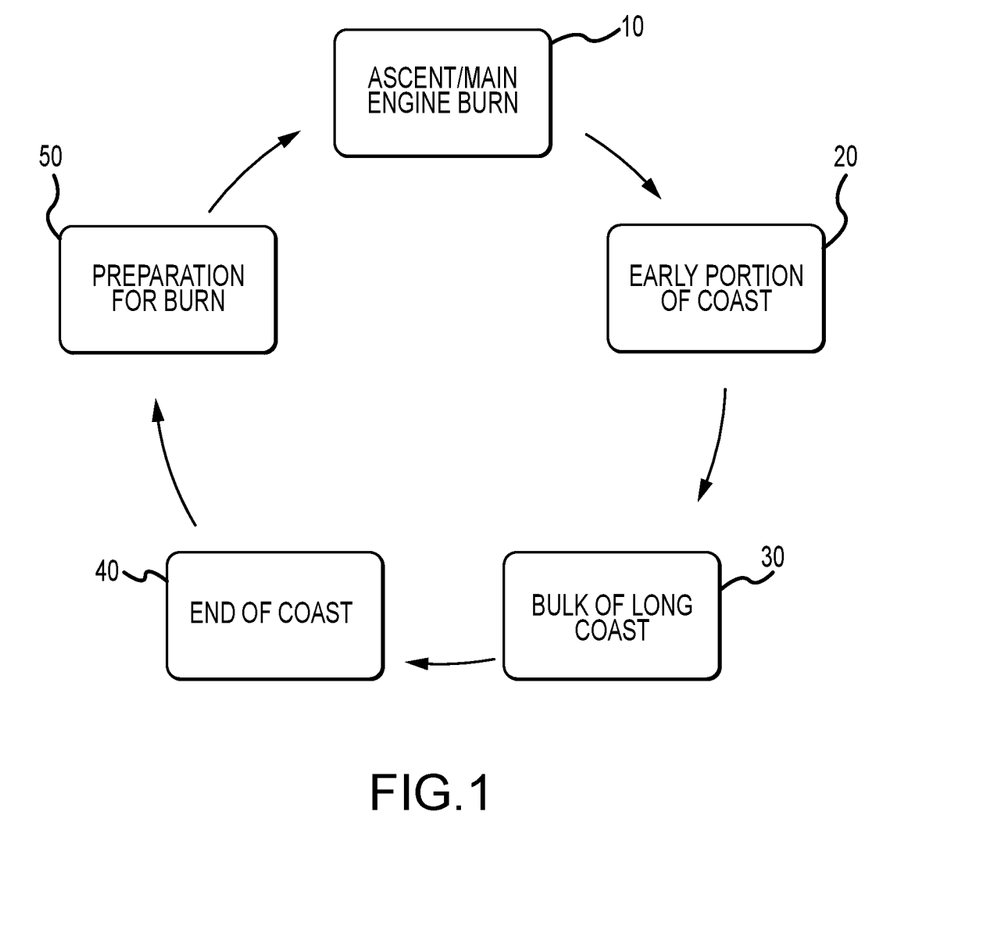
FIG. 1 is a flow chart representing a cycling of a propellant system associated with a launch vehicle.

FIG. 1 is a flow chart representing typically recurring states of an upper stage spacecraft over the duration of a mission. Initially, a launch vehicle and associated upper stage are on a launch pad preparing for ascent. Liquid propellant is continuously fed into propellant tanks, and the tanks are continuously vented to equalize pressure within the propellant tanks due to boil off. Prior to lift off, connections to the launch vehicle and upper stage are disconnected, liquid propellant is delivered to the launch vehicle engines from one or more propellant tanks and the engines ignite and burn the propellant. The launch vehicle ascends through the atmosphere. Acceleration from the main engines of the launch vehicle is typically between 0.5 and 4.0 g. At a predetermined point, the launch vehicle separates from the upper stage. The launch vehicle returns to Earth. Following separation, the main engines on the upper stage ignite and, at 10, the upper stage continues its ascent. Liquid propellant from one or more tanks on the upper stage supplies the main engines. At 20, the engines of the upper stage are shut down and a period of coasting begins. Settling motors are used to settle the movement or sloshing of the propellant within each tank caused by vibrations generated by the engine burn of both the launch vehicle and upper stage engines. At 30, the liquid propellant in the tanks of the upper stage has settled and the upper stage is in a long coast phase. During the coast period, the engines cool. Following engine shut down, residual propellant in the supply lines between the propellant tanks and the engine is likely to turn to gas due to heat from the engine(s) and external sources warming the propellant supply line to a temperature that cause liquid propellant to boil off. The upper stage will also be repositioned to counteract external solar heating. Settling motors are used to accomplish any repositioning and to re-settle propellant due to such repositioning. At 40, the upper stage prepares to end the period of coasting. At 50, the engines are prepared for a burn. Any gas phase propellant within the supply line and engine is evacuated and the supply lines are filled with liquid propellant. At 10, the upper stage main engines are again ignited and propellant is burned. This cycle may be repeated as necessary to position the upper stage for mission objectives.

FIGS. 2-5 and 7 are cross section views of one embodiment of a propellant system 200 designed for a launch vehicle or upper stage spacecraft. A two-propellant system is illustrated, however it should be understood that the present disclosure applies to single or multiple propellant systems. In these illustrations, the upper tank 210 stores liquid hydrogen and the lower tank 212 stores liquid oxygen. Different propellants may be used. A central vent line 214 extends from a valve 216 through the lower liquid oxygen tank 212 and into the upper liquid hydrogen tank 210. A liquid hydrogen supply line 218 extends from the hydrogen tank 210 to the main engines (not shown). The vent and supply line may also go around the lower tank. Valves 220 are positioned between the main engines and the hydrogen tank 210 to control the flow of propellant to the engines. A portion of the hydrogen supply line 218 traverses the liquid oxygen tank 212 and surrounds the vent line 214 forming an annular space 222 for the flow of cryogenic liquid hydrogen to the engines. A vapor retention device 224 is positioned proximate the interface between the supply line 218 and the hydrogen tank 210. It should be understood that in the case of a single propellant vehicle the supply line would not extend through another tank but would otherwise serve the same purpose.

Figure 2:
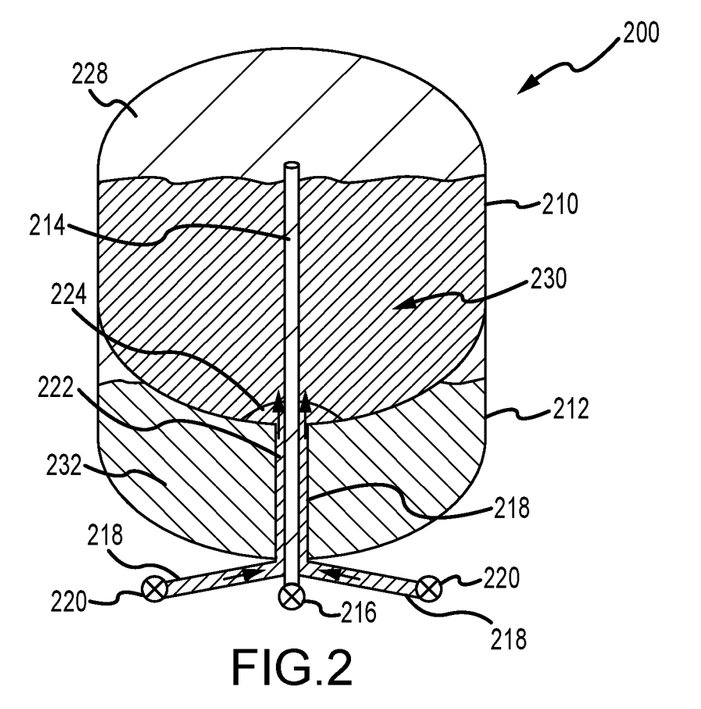
FIG. 2 is a section view of a first embodiment of a dual propellant system for a launch vehicle, with one liquid propellant being added to a propellant tank, for example, prior to launch.

Turning to FIG. 2, a propellant system 200 for a launch vehicle or upper stage is shown as it may exist prior to launch. The upper tank 210 includes liquid hydrogen 230 and the lower tank 212 included liquid oxygen 232. Gaseous hydrogen or ullage 228 is forming in the upper portion of the upper tank 210 due to boil off. The gas is vented out of the tank through valve 216 to maintain tank pressure and proper levels. As also illustrated, valves 220 are open and liquid hydrogen is being supplied to the upper tank 210 through the hydrogen supply to replace liquid propellant losses due to boil off. Although not shown, the same actions are occurring with respect to the liquid oxygen tank. The liquid oxygen 232 within tank 212 also generates ullage due to boiloff of the liquid oxygen. Although not illustrated, the oxygen tank 212 would similarly include a liquid oxygen supply line, a gaseous oxygen access line and associated valves to control the flow of liquid and gaseous oxygen into and out of the tank 212.

Figure 3A:
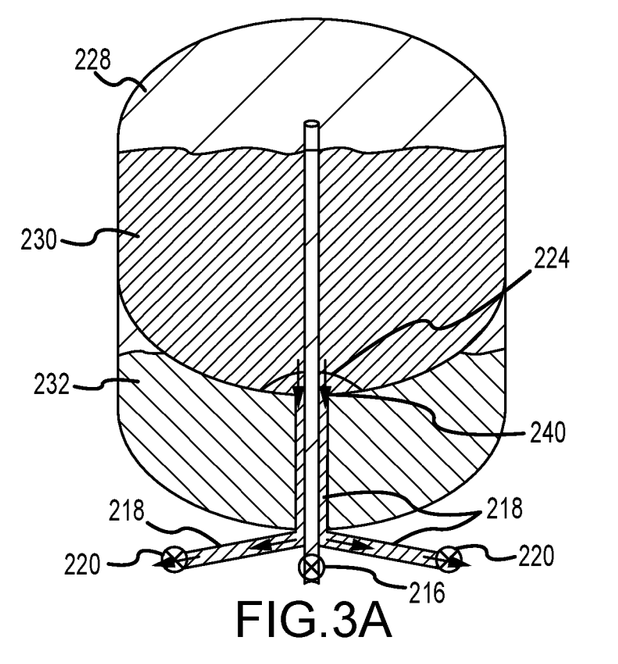
FIG. 3A is a section view of the embodiment of FIG. 2 during engine burn, where propellant is supplied to the engine(s).

FIG. 3A corresponds to state 10 in FIG. 1. Specifically, liquid hydrogen 230 is being supplied to the main engines (not shown) for engine burn. The flow of the liquid hydrogen is represented by the arrows in supply line 218. Liquid oxygen 232 is also being supplied to the engines, but the supply line is not shown. During engine burn, the heat produced by the engine heats the surrounding structures, including supply line 218 and valves 220. However, the liquid propellants are moving from the tanks 210 and 212 at a sufficient rate to prevent boil off.

Figure 3B:
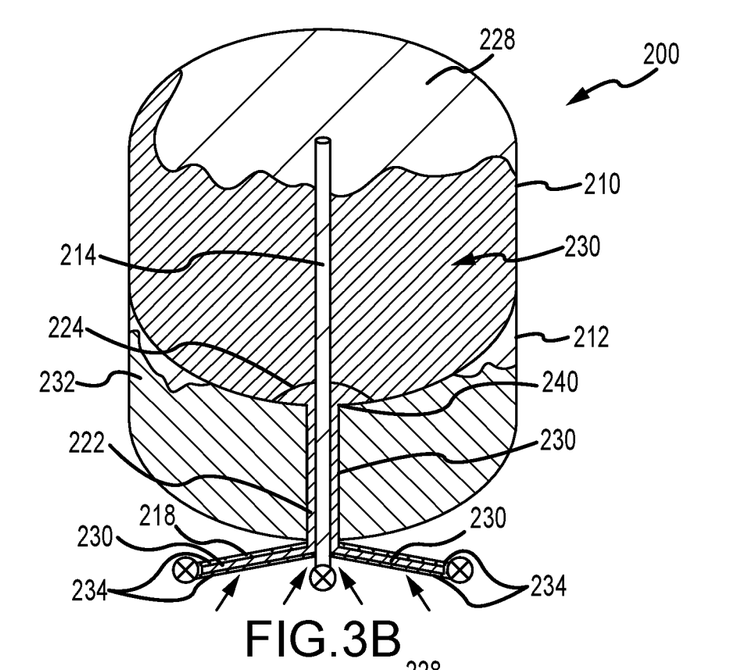
FIG. 3B is a section view of the embodiment of FIG. 3A, post launch, where the engines are shut down and the launch vehicle is entering a coast mode.

FIG. 3B illustrates the propellant system 200 following engine shut down. This corresponds to state 20 in FIG. 1. At this point, the liquid propellant is no longer flowing in the supply line 218 but is now stagnant. Valves 220 are closed. However, the liquid hydrogen 230 and liquid oxygen 232 are sloshing within the propellant tanks 210 and 212, respectively, due to the vibration generated by the operation and shut down of the main engines. Heating of the propellant sump and supply lines (indicated by the arrows) initiates boil off of the liquid propellant at the hot surfaces. Low settling levels and heating in the supply line 218 closest the engine cause gaseous hydrogen 234 initially to form along the inner wall of the supply line 218 closest to the hot engine. Gaseous bubbles form, coalesce and grow larger. Surface tension effects dominate. The annular space 222 is still filled with liquid hydrogen 230 at this point in time.

Figure 3C:
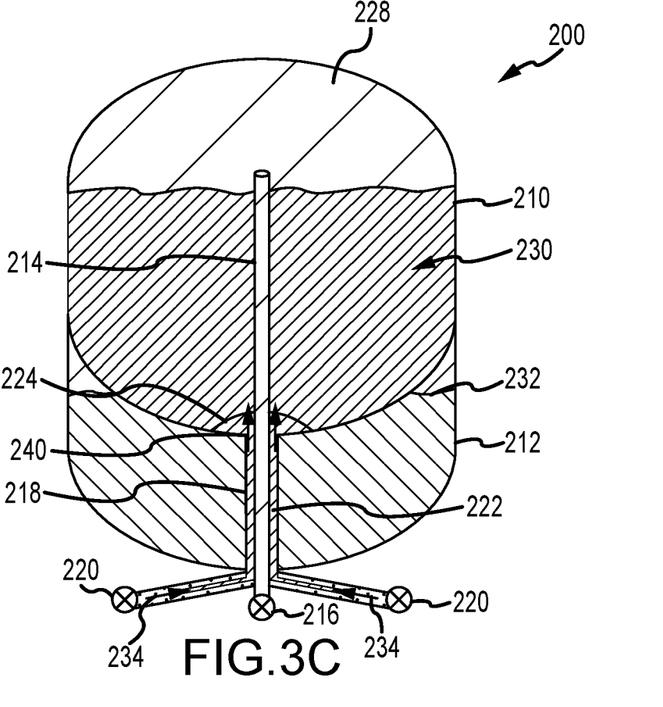
FIG. 3C is a section view of the embodiment of FIG. 3B, still in a coast mode but later in time compared to FIG. 3B.
Figure 3D:
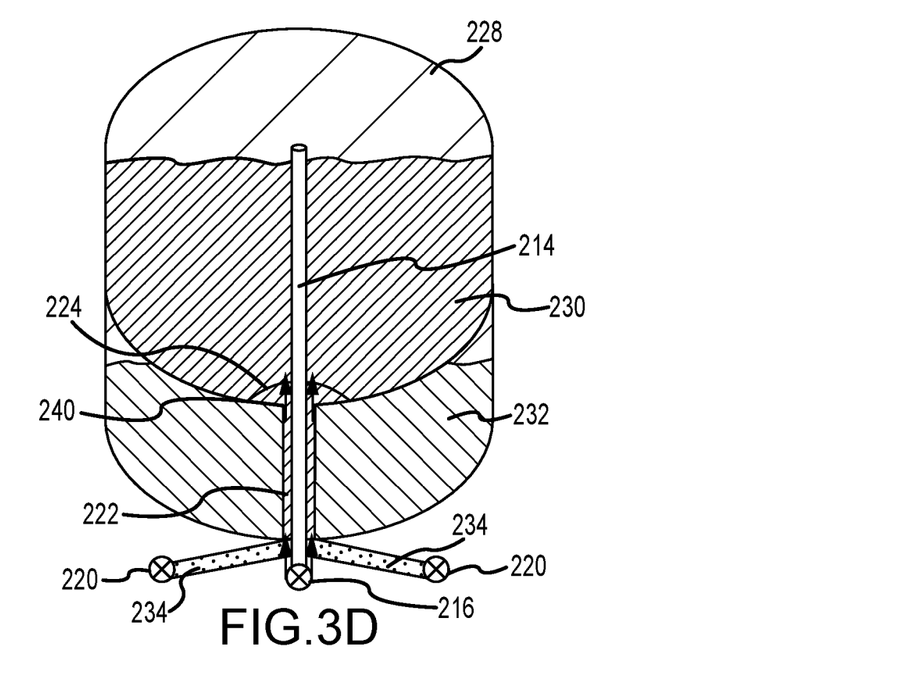
FIG. 3D is a section view of the embodiment of FIG. 3C, still in a coast mode but later in time compared to FIG. 3C.
Figure 3E:
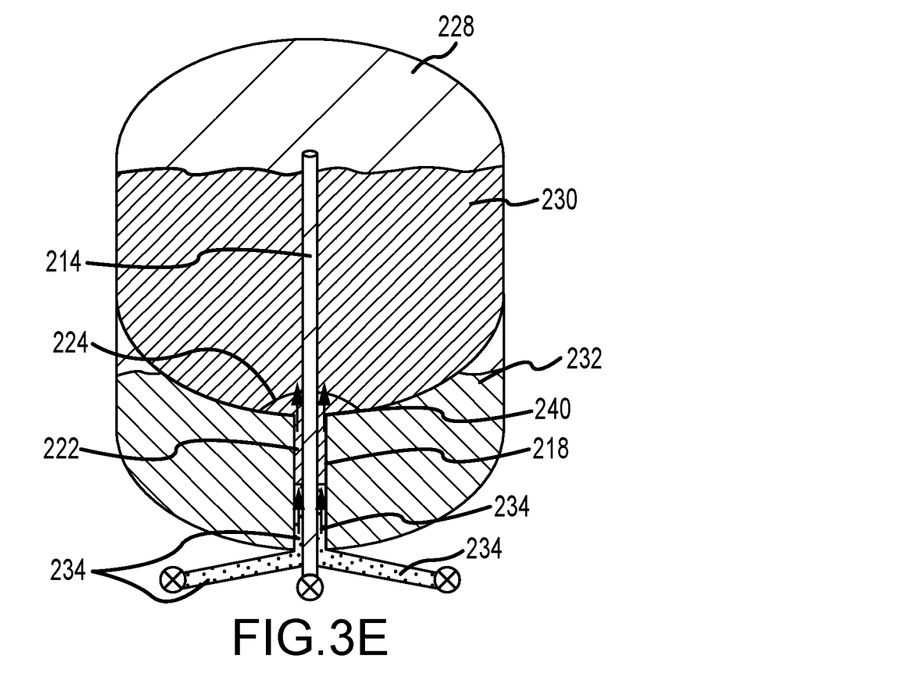
FIG. 3E is a section view of the embodiment of FIG. 3D, still in a coast mode but later in time compared to FIG. 3D.

As illustrated in FIG. 3C, settling of the cryogenic propellants (hydrogen and oxygen) has occurred due to operation of the settling motors. The upper stage is in a coast period. The gaseous hydrogen bubbles 234 continue to grow in the supply line 218 as more liquid propellant boils off. Ultimately, slug flow occurs and the enlarging hydrogen gas bubble pushes liquid hydrogen 230 remaining in the supply line back into the liquid hydrogen tank 210. This is sequentially illustrated in FIGS. 3B-3F. The slug flow of the gaseous hydrogen 234 has a positive benefit. It acts similar to a piston, forcing liquid hydrogen 230 back into the liquid hydrogen tank 210 where the returned liquid hydrogen is preserved in a liquid state for future use. By channeling the effects of boil off, liquid propellant may be preserved for future use instead of transitioning to a gas phase that is not burnable by the main engines.

Figure 4A:
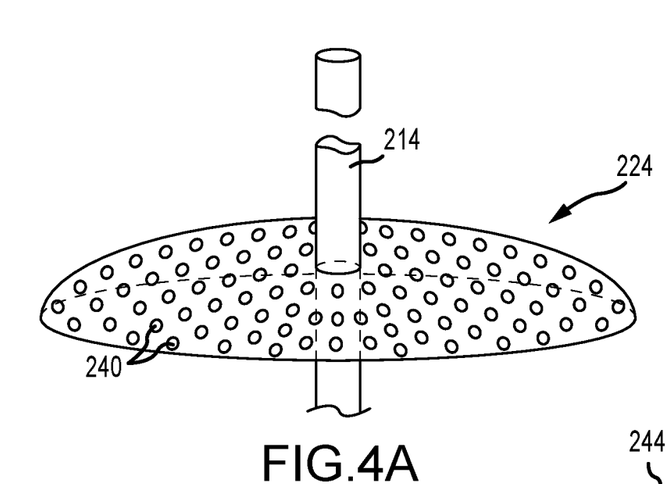
FIG. 4A is a perspective view of one embodiment of a vapor retention device according to the present disclosure.
Figure 4B:
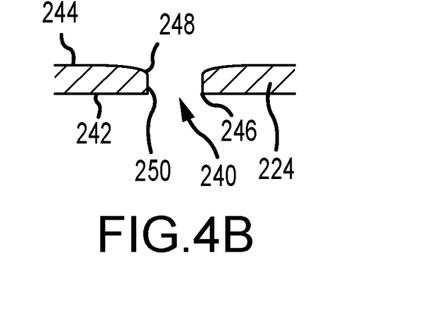
FIG. 4B is an enlarged cross-section view of an aperture of the vapor retention device of the embodiment of FIG. 4A.

A vapor retention device 224 is positioned at the propellant supply port 240 of the hydrogen tank 210. One embodiment of a vapor retention device 224 is illustrated in FIGS. 4A and B. Another embodiment of a vapor retention device for alternate tank configuration would place the device at the tank exit independent of the orientation of the supply line. The vapor retention device comprises a screen or membrane with openings or apertures sized to create a stable liquid-gas interface at the acceleration provided by the upper stage during a coast. Typically, settling thrusters or motors (not shown) provide the needed acceleration. This interface prevents the gaseous hydrogen 234 formed in the supply line 218 from migrating into the liquid hydrogen tank 210 and prevents liquid hydrogen 230 from migrating into the supply line 218 where heating sources would continue to create gaseous hydrogen 234 from the fresh liquid hydrogen 230. In addition, the hydrogen gas 234 trapped in the supply line 218 acts as an insulating barrier between the cold liquid propellants and the heating sources shown as arrows. Thus, instead of losing additional liquid propellant due to boil off, embodiments of the present disclosure harness the formation of gaseous propellant in supply lines to push liquid propellant back into propellant tanks and restrict the movement of the liquid propellant preventing it from coming into contact with sources of heat which would create excessive boiloff. Settling acceleration of the upper stage is utilized to create the buoyant driving force which enhances the piston effect described above.

Figure 3F:
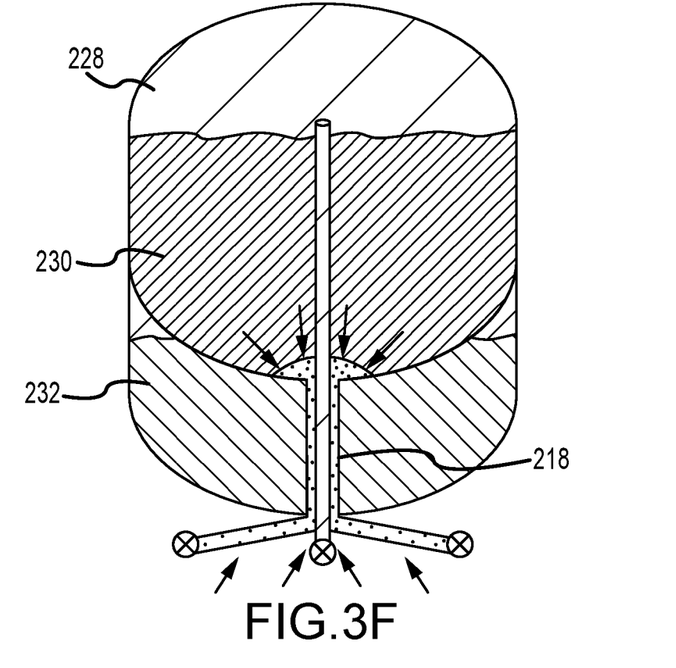
FIG. 3F is a section view of the embodiment of FIG. 3E, still in a coast mode but later in time compared to FIG. 3E.

FIG. 3F illustrates a propellant system state where the supply line 218 is empty of liquid propellant. This state corresponds to a coast state, such as at 30 in FIG. 1. Motion or movement of the upper stage is controlled by settling motors to maintain settling forces below a threshold value that allows the effects of surface tension within the gaseous hydrogen 234 at the interface with the vapor retention device 224 to dominate. According to aspects of the present disclosure, maintaining an acceleration of between about $10^{-3}$ and $10^{-5}$ G's will allow the surface tension to dominate. This effect is illustrated by the arrows which represent a balanced or controlled level of settling that maintains the needed stable liquid-gas interface. As a result, the gaseous hydrogen is prevented from migrating through the vapor retention device and entering the liquid propellant tank 210 and liquid is prevented from entering the supply line 218 where it would encounter deleterious heating.

Those of skill in the art will know the physical force balance term "Bond Number" which can be utilized to determine the stability of a liquid gas interface. This parameter will indicate the maximum dimension where a stable interface will exist at a certain acceleration. Consequently, by matching vehicle acceleration and critical dimensions of the apertures in the vapor retention device a stable interface can be controlled and utilized in the method shown herein. Because the acceleration and critical dimensions are inversely related, once the acceleration goes below that threshold the stable interface will remain, including down to 00 G conditions, unless dislodged by pressure differentials which occur, for example, when the upper stage main engines operate and acceleration exceeds the threshold value. Heat transfer between the liquid oxygen tank 212 and the liquid hydrogen tank 210 by way of the feedline 218 is reduced by removal of the liquid hydrogen from the annular space 222 since heat transfer is driven by a temperature difference and surface area. Liquid hydrogen, typically maintained at −420 degrees Fahrenheit, is held away from the liquid oxygen, typically maintained at −320 degrees Fahrenheit and other heat sources, such as the propellant sump and supply lines. The only contact area between the cold liquid hydrogen and warm gas is across the stable liquid-gas interface in the VRD represented by arrows. The heat transfer across the liquid gas interface and along thin pieces of structure are orders of magnitudes lower than direct conduction from the heat source across tank structure to liquid cryogens.

FIG. 4A illustrates an example of how a vapor retention device could be designed to create the propellant saving effects described herein. Apertures 240 are sized so that the critical dimension matches the chosen stage acceleration. That is at the chosen stage acceleration during long coasts the liquid gas interface will remain stably attached to holes of this size or smaller. According to aspects for the present disclosure, the holes preferably are on the order of 0.5-3.0 inches in diameter depending on the stage acceleration chosen for the long coast. Openings within this diameter range will work with a coast acceleration of between about $10^{-3}$ to $10^{-5}$ Gs. The shape of the hole and hole edges also play a role in promoting the liquid gas interface attaching to it without unduly hindering the flow once the vehicle enters state 50 and 10. FIG. 4B illustrates one preferred example of a hole shape. As illustrated, the vapor retention device has a first surface 242 and an opposed surface 244. With reference to FIG. 4A, the first surface 242 is the inner surface and the second surface 244 is the outer or upper surface. At the first surface 242, the edge 246 of the hole is sharp angle while at the outer surface 244 there is no discrete edge, but rather a gradual rounded transition 248 from the surface 244 to the inside surface 250 of the aperture 240. Liquid propellant would be positioned on the side proximate first surface 242 and gaseous propellant would be positioned on the side proximate second surface 244. The angle between the inside surface 250 and first surface 242 is approximately 90 degrees but could be between approximately 90 and 45 degrees, preferably approximately 70 to 90 degrees, and most preferably approximately 80 to 90 degrees. Up to a 5-degree change in the angle would fall within these ranges. The sharp edge 246 enhances the ability of the liquid to attach to the vapor retention device 240 and inhibit the transfer of gas into a propellant tank. Alternative designs may include variations of hole placement and vapor retention device shape to select the angle between the centerline of the hole and the axial acceleration vector of the vehicle. For example, instead of a dome shape as illustrated in FIG. 4A, the vapor retention device 224 could by conical, frusto-conical, pyramid or box shaped. Further considerations to the vapor retention device include preventing large pressure drops at the high flowrates to the engines during state 10. The quantity of holes relative to the opening size of the holes must be sufficient to supply propellant to the main engines as needed during prescribed burns.

Figure 5:
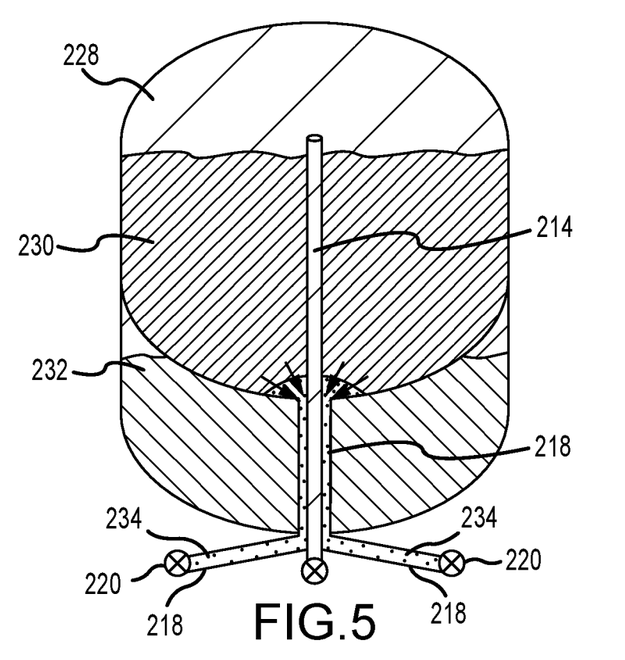
FIG. 5 is a section view of the embodiment of FIG. 3F, with the propellant system preparing for an engine burn.

FIG. 5 corresponds to state 40 in FIG. 1. Here, the upper stage or spacecraft is ending a coasting period. Settling of the liquid propellant increases in the aft direction. This increases the pressure of the liquid propellant against the vapor retention device 224. Increased settling changes the balance of the surface tension forces with other forces on the interface with the vapor retention device 224. Arrows represent the breakdown of the stable liquid-gas interface and the start of liquid flow into the gas filled supply line 218. This flow will start to chill the supply line in preparation for an engine burn.

Figure 6:
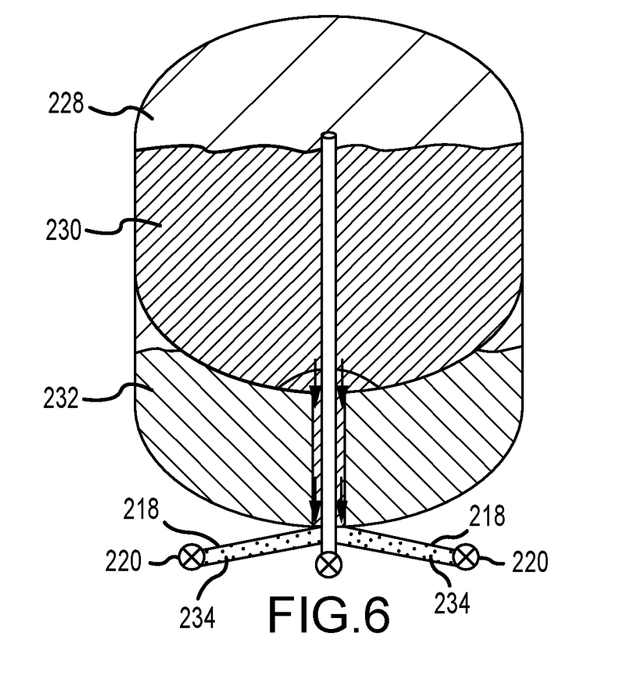
FIG. 6 is a section view of the embodiment of FIG. 5, with the engine actively burning propellant.

FIG. 6 corresponds to state 50 of FIG. 1. Here, the upper stage is preparing for an engine ignition and burn. Engine valves (not shown) and supply line valves 220 are opened allowing the pressure in the liquid hydrogen tank 210 to push out the gaseous propellant 234 from the supply lines 218 and push in liquid propellant 230 to fill the supply lines including line 218 and finishes chilling the supply lines back to liquid hydrogen temperatures. Once gaseous hydrogen 234 is evacuated from the engine and supply lines and liquid hydrogen and oxygen fill the supply lines, the main engines are ignited. This state is illustrated in FIG. 3A and corresponds to state 10 in FIG. 1.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. It is to be understood that the phraseology and terminology used herein is for the purpose of description and should not be regarded as limiting.

What is claimed is:

1. A method for controlling propellant in an upper stage vehicle, comprising:
   providing the upper stage vehicle having a propellant tank containing a cryogenic propellant in a liquid phase, a supply line extending from a port in the propellant tank to a propellant-burning engine, wherein the supply line contains the cryogenic propellant in a gas phase;
   covering the port with a vapor retention device that has a plurality of openings configured to permit the cryogenic propellant in both the liquid phase and the gas phase to pass in a direction toward the supply line, the vapor retention device having a first surface and a second surface opposite the first surface and wherein the second surface is closer to the port;
   accelerating the upper stage vehicle at no more than $10^{-3}$ G during a coast state; and
   maintaining an interface between gas-phase and liquid-phase propellant at the plurality of openings and preventing gas-phase propellant from passing through the vapor retention device from the second side to the first side.

2. The method of claim 1, wherein accelerating the upper stage vehicle during the coast state is provided by a settling thruster.

3. The method of claim 1, wherein accelerating the upper stage vehicle during the coast state is at more than $10^{-5}$ G to settle the liquid-phase cryogenic propellant in the propellant tank.

4. The method of claim 1, wherein each opening of the plurality of openings is not more than 3.0 inches at the widest point.

5. The method of claim 1, wherein each opening of the plurality of openings is no less than 0.5 inches at the narrowest point.

6. The method of claim 1, further comprising:
following maintaining the interface, evacuating gas-phase cryogenic propellant from the supply line,
causing the liquid-phase cryogenic propellant to move through the vapor retention device and to the engine using the supply line; and
consuming the liquid-phase cryogenic propellant by operating the engine.

7. The method of claim 6, further comprising:
following ceasing operation of the engine, changing the phase of a first portion of the liquid-phase cryogenic propellant in the supply line to a gas phase;
forcing a second portion of the liquid-phase cryogenic propellant remaining in the supply line to move through the vapor retention device into the propellant tank; and
forming an insulation barrier comprising gas-phase cryogenic propellant in the supply line between the engine and the vapor retention device.

8. The method of claim 7, further comprising:
closing a valve between the supply line and the engine as operation of the engine is ceased.

9. The method of claim 1, wherein each opening of the plurality of openings is defined by a side wall extending between the first surface and the second surface of the vapor retention device, and wherein a transition between the first surface and the side wall of each hole is an angle of approximately 90 degrees and a transition between the second surface and the side wall is rounded.

10. The method of claim 1, further comprising:
providing a vent line in communication with the propellant tank, the vent line having a vent valve; and
opening the vent valve and venting gas-phase cryogenic propellant from the propellant tank, through the vent line, and out of the upper stage vehicle.

11. A method for controlling propellant in an upper stage vehicle, comprising:
providing the upper stage vehicle having a propellant tank containing a cryogenic liquid propellant, a port having a first side in communication with the interior of the propellant tank and a second opposite side in communication with a supply line extending from the second side of the port to an engine, wherein the supply line contains a gaseous propellant;
covering at least the first or second side of the port with a vapor retention device that has a plurality of holes;
forming an interface between the liquid and gaseous propellant across the plurality of holes;
accelerating the upper stage vehicle at a rate to maintain a surface tension of the liquid propellant on the vapor retention device and to prevent gaseous propellant from passing the vapor retention device;
supplying the cryogenic liquid propellant to the engine using the supply line;
consuming the cryogenic liquid propellant by operating the engine;
following ceasing operation of the engine, changing the phase of a first portion of the cryogenic liquid propellant in the supply line to a gaseous phase;
forcing a second portion of the liquid cryogenic propellant remaining in the supply line move into the propellant tank; and
forming an insulation barrier comprising gaseous phase propellant in the supply line between the engine and the vapor retention device.

12. The method of claim 11, wherein accelerating the upper stage vehicle during the coast state is provided by a settling thruster.

13. The method of claim 11, wherein accelerating the upper stage vehicle during the coast state is at no more than $10^{-3}$ G to maintain the surface tension of the liquid propellant.

14. The method of claim 11, wherein accelerating the upper stage vehicle during the coast state is at more than $10^{-5}$ G to settle the cryogenic liquid propellant in the propellant tank.

15. The method of claim 11, wherein each hole of the plurality of holes has a diameter of at least 0.5 inches.

16. The method of claim 11, further comprising:
closing a valve between the supply line and the engine as operation of the engine is ceased.

17. The method of claim 11, wherein each hole of the plurality of holes is defined by a side wall extending between a first surface and a second surface of the vapor retention device, and wherein a transition between the first surface and the side wall of each hole is an angle of approximately 90 degrees and a transition between the second surface and the side wall is rounded.

18. The method of claim 11, further comprising:
providing a vent line in communication with the propellant tank, the vent line having a vent valve; and
opening the vent valve and venting gas-phase cryogenic propellant from the propellant tank, through the vent line, and out of the upper stage vehicle.

19. A method for controlling propellant in an upper stage vehicle, comprising:
providing the upper stage vehicle having a propellant tank containing a cryogenic liquid propellant, a port having a first side in communication with the interior of the propellant tank and a second opposite side in communication with a supply line extending from the second side of the port to an engine, wherein the supply line contains a gaseous propellant;
covering at least the first or second side of the port with a vapor retention device that has a plurality of holes, wherein each hole of the plurality of holes is defined by a side wall extending between a first surface and a second surface of the vapor retention device, and wherein a transition between the first surface and the side wall of each hole is an angle of approximately 90 degrees and a transition between the second surface and the side wall is rounded;
forming an interface between the liquid and gaseous propellant across the plurality of holes; and
accelerating the upper stage vehicle at a rate to maintain a surface tension of the liquid propellant on the vapor retention device and to prevent gaseous propellant from passing the vapor retention device.

20. The method of claim 19, wherein accelerating the upper stage vehicle during the coast state is at no more than $10^{-3}$ G to maintain the surface tension of the liquid propellant.

* * * * *